United States Patent [19]

Aloisio, Jr. et al.

[11] 4,434,120

[45] Feb. 28, 1984

[54] INJECTION MOLDED KNOCKOUT

[75] Inventors: Charles J. Aloisio, Jr., Chamblee; Ray R. Cammons, Woodstock, both of Ga.

[73] Assignee: Bell Telephone Laboratories, Incorporated, Murray Hill, N.J.

[21] Appl. No.: 309,980

[22] Filed: Oct. 9, 1981

[51] Int. Cl.³ .................................................. B29F 1/00
[52] U.S. Cl. .................................. 264/155; 264/328.8; 264/328.12
[58] Field of Search ................ 264/328.12, 242, 328.8, 264/155; 425/DIG. 109, DIG. 3

[56] References Cited

U.S. PATENT DOCUMENTS 2,724,867 11/1955 Smith ........................ 425/DIG. 109
3,069,105 12/1962 Press ............................... 264/242 X
3,767,753 10/1973 Suzuki ...................... 264/328.12 X

FOREIGN PATENT DOCUMENTS 53-112957 10/1978 Japan .............................. 264/328.12

OTHER PUBLICATIONS

Plastics Engineering, Oct. 1973, pp. 67–69, "Weld-Live Fracture in Molded Parts".

Primary Examiner—Thomas P. Pavelko
Attorney, Agent, or Firm—James H. Fox

[57] ABSTRACT

A technique is shown for injection molding knockout sections in plastic parts. Through the introduction of a weld line in a controlled manner, removable sections of any geometry may be incorporated in a part. By varying the weld line geometry, knockout forces may be varied over a wide range. An example of a circular knockout in polycarbonate material is shown.

9 Claims, 13 Drawing Figures

INJECTION MOLDED KNOCKOUT

BACKGROUND OF THE INVENTION

1. Field of the Invention

This invention relates to a technique for the injection molding of removable sections in polymeric articles.

2. Description of the Prior Art

Junction boxes used for making electrical connections typically have circular knockout sections for the optional installation of wiring into the boxes. When the junction boxes are made of metal, the knockout sections are typically made by stamping a pattern in the sheet metal that is used to form the box. In many cases, this results in gaps around the periphery of the knockout piece being supported at one or two points along its edge. Many types of junction boxes, including pedestals used for the outdoor installation of telephone cable, are made of plastic or other polymeric materials. In many cases, it is desirable to maintain a hermetic seal in such enclosures; therefore, any knockout portions that have not been removed must not have gaps around the edges. The knockout portions should be strong enough to prevent inadvertent leakage prior to the removal of the knockout, but the knockout should also be capable of being removed conveniently, for example with a hammer or other simple tool, without damage to the rest of the enclosure.

In the past, one method by which knockout regions have been provided in polymer materials is by first producing a hole of the desired size and plugging it with a grommet to provide a seal until removed. This requires more time and expense than if the knockout were formed directly in the polymer material. However, it is typically not feasible to employ stamping techniques to form a knockout region in polymeric material, especially if it is desired to maintain a hermetic seal prior to removal of the knockout.

One of the more common molding techniques utilized with polymeric material is injection molding, including reaction injection molding, whereby fluid polymer or prepolymer material comprising one or more fluid components is injected under pressure into a cavity having the desired shape. However, restrictions of the flow of the material during injection can produce gaps, voids, and other undesirable effects in the molded article. It is desirable to have a technique for forming a knockout section in an injection molded article that satisfies the above criteria of maintaining a hermetic seal until removed, while allowing ease of removal, and maintaining compatibility with the injection molding process.

SUMMARY OF THE INVENTION

We have invented a technique for producing a removable section in an article. In this technique, fluid polymer or prepolymer material is introduced into a cavity. A portion of the material flows through one or more gates from a first region of the cavity into a second region of the cavity, whereby the boundary between the resulting regions of the article exclusive of the gates is a weld line formed by the flow front of the material. The weld line so formed typically has a cross section substantially thinner than either the first or second regions. One of the regions can be partially or totally surrounded by the other region. Upon at least partial solidification, the material is removed from the cavity.

DETAILED DESCRIPTION

The following detailed description relates to an injection moldable knockout that utilizes the introduction of a weld line in a controlled manner. In one embodiment, a circular knockout is shown, but the technique is not limited to that geometry. A restricted flow region is provided in a cavity at the boundary of the knockout geometry. The cavity is filled by material flow on both sides of, but not across, the boundary, except at an internal knockout passageway, referred to herein as a "gate". One or more gates are used to allow material to flow from one side of the boundary to the other while filling the cavity. The term "gate" is also used herein to denote the corresponding region of the polymeric article. It is distinguished from the term "external gate", which is a passageway used to introduce polymer or prepolymer fluid into the cavity from an external source. Similarly, the other cavity regions referred to herein produce corresponding regions in the resulting article, with the usage being as indicated by the context.

Figure 1:
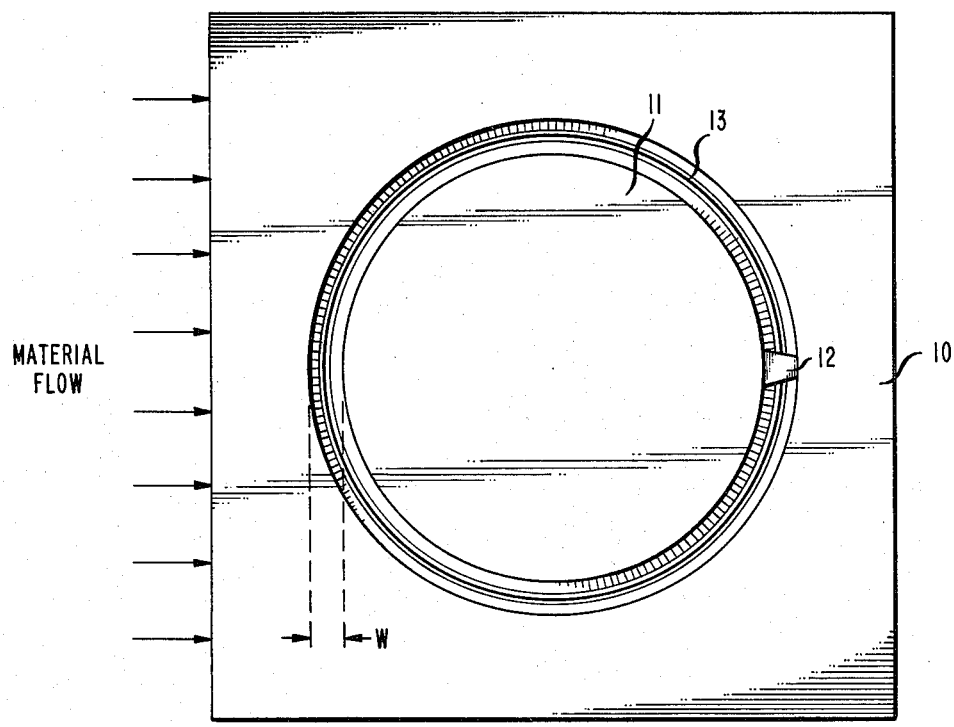
FIG. 1 shows a top view of a typical injection molded knockout.

FIG. 1 shows one embodiment of the injection moldable knockout. The knockout 11 is a disc surrounded by a boundary 13 and a gate 12 which allows passage of polymer or prepolymer fluid material into the knockout region from the surrounding region 10. The thickness of the boundary 13 is sufficiently small so that substantially no material flows across boundary 13 during the injection molding process; rather, the material is injected through gate 12 from the exterior region 10 into the knockout region 11. More than one gate may be provided for reduced filling time or improved uniformity of fill as required.

Figure 2:
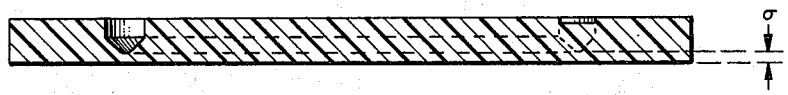
FIGS. 2–4 show cross sections of typical injection molded knockouts.
Figure 3:
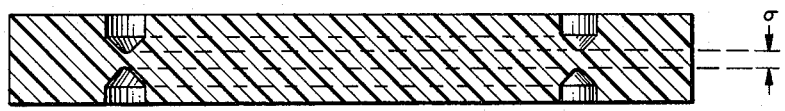
Figure 4:
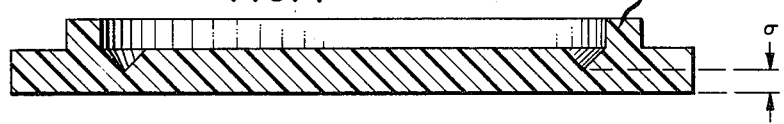
Figure 5:
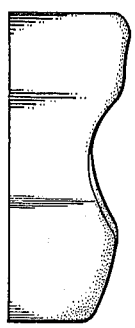
FIGS. 5–12 show a typical cavity filling sequence.
Figure 6:
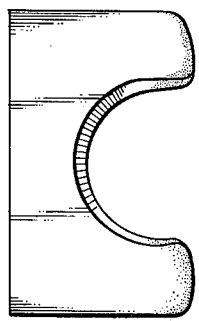
Figure 7:
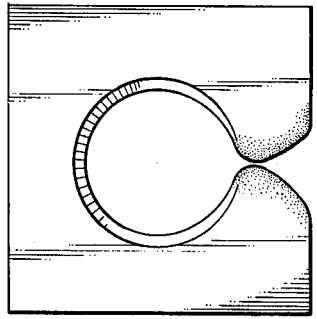
Figure 8:
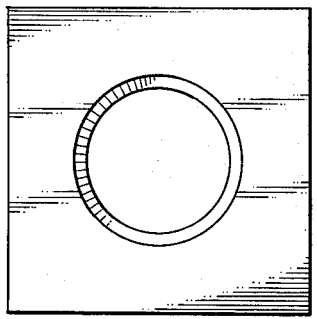
Figure 9:
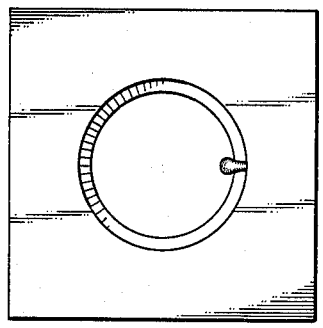
Figure 10:
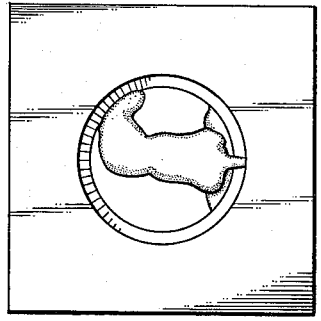
Figure 11:
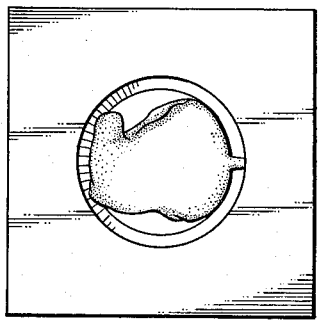
Figure 12:
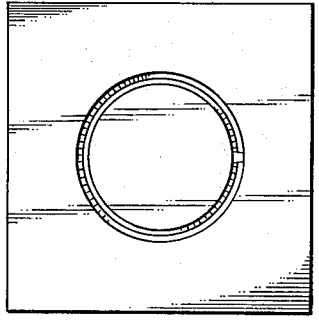

FIGS. 2–4 show typical cross section views of relevant portions of a molded article, and indicate various configurations for the boundary 13, with still others being possible. In FIG. 4, a lip 41 is included to further protect wiring entering a junction box. The minimum thickness of the boundary is indicated as $\sigma$. Polymer material forms a continuous fill across the boundary. However, this is achieved not by flowing material across the boundary, but rather by the convergence of flow fronts at the boundary. This is illustrated in a time sequence series in FIGS. 5–12. In the initial filling operation shown in FIGS. 5–8, the material first substantially fills outer region 10. FIG. 9 shows that the material then begins to flow through gate 12 into the interior region 11. FIGS. 10 and 11 show further filling of the interior region and illustrate how the flow fronts from the outer region and the inner region converge at boundary 13. The completely filled cavity is shown in FIG. 12. Other sequences are possible, and it is not necessary that the outer portion completely fill before the inner portion begins to fill.

The point at the boundary at which the fluid fronts converge forms a "weld line", also known as a "knit line" in the injection molding art. Weld lines in most prior art processes are an unavoidable result of material converging from two or more directions in a region of the cavity. They typically result from injecting material from two or more external gates, or from the flow of the material as it converges into a restricted area. Normally, weld lines are points of weakness, and in some cases, are considered blemishes on the product. In the past, attempts were typically made either to minimize the occurrence of weld lines or reduce their visual prominence in the finished article, as by polishing the surface at the weld line.

In the present application, the thickness $\sigma$ of the boundary region is chosen to obtain a suitably low striking force for removing the knockout. This is especially significant when it is noted that many types of injection molded plastic articles utilize material, for example polycarbonate material, that has a high impact resistance. In the present technique, $\sigma$ can be sufficiently small so that the knockout may be removed without producing substantial damage to the surrounding region of the article. In addition, it is desirable to choose $\sigma$ so that the knockout itself is not damaged, to allow its removal in one piece. Typically, 5 to 10 mils (0.13 to 0.25 mm) thickness for $\sigma$ is suitable in this regard for polycarbonate material. Other polymer materials may require different values of $\sigma$. On the other hand, $\sigma$ should be large enough so that the weld line forms a hermetic seal and provides for retention of the knockout in the normal environment of the molded article. The present technique allows adjusting $\sigma$ to any desired value.

The gate 12 is large enough to allow suitably rapid filling of interior region 11 to provide for an economical production rate of the molded article. However, gate 12 should be small enough so that the force required to remove the knockout is not increased beyond a desirable amount. It has been found desirable to taper the gate, as shown, with the narrow portion communicating with the external region 10 and the wide portion communicating with the internal region 11. This facilitates the removal of the gate along with the knockout, preventing a stub being left due to incomplete gate removal.

For more rapid filling of the cavity or to accommodate more complex geometries for the knockout, more than one gate can be provided. In practicing the present invention, typically at least 90 percent of the boundary length between the knockout and the surrounding region consists of the weld line, with less than 10 percent typically being devoted to the gate or gates. In the injection process, air trapped in the knockout region 11 can escape via an opening in the mold (not shown) along boundary 13 that is small enough to prevent polymer material from escaping from the cavity, according to principles known in the art. It is also possible to fill the cavity by injecting the material into the internal region 11, with the material then flowing through the gate into the external region 10. The material can also be injected into both regions simultaneously, with the material flowing through the gates as required to obtain more even filling of the cavity regions.

The above principles will be more fully illustrated by means of the following example.

EXAMPLE

A plastic piece having the configuration of FIG. 1 was formed by the injection molding of polycarbonate material. The piece had dimensions of 2 inches by 2 inches (5 cm $\times$ 5 cm), with a thickness of approximately 3/32 inches (2.4 mm). The knockout was circular in shape, having a diameter of approximately 1 inch (2.5 cm). The gate 12 had a thickness of 0.05 inches (1.3 mm) and was tapered to have an opening 0.04 inches (1.0 mm) wide on the outer side, and 0.10 inches (2.5 mm) wide on the knockout side. The width W of the boundary region was approximately 1/16 inch (1.6 mm). The thickness of the boundary region $\sigma$ was varied from 8 to 20 mils (0.2 to 0.5 mm) in three different trials, with the force required to punch out the knockout being indicated for each thickness in Table 1 below. The punchout was accomplished using the Gardner Drop Dart Test. The 8 and 10 mil thicknesses can be conveniently removed without damage to the surrounding regions or to the knockout, while the 20 mil thickness typically cannot be removed without puncturing the knockout.

TABLE 1

| $\sigma$ mils | Inch-Lbs. |
|---|---|
| 8 | 5 |
| 10 | 25 |
| 20 | >160 |

Figure 13:
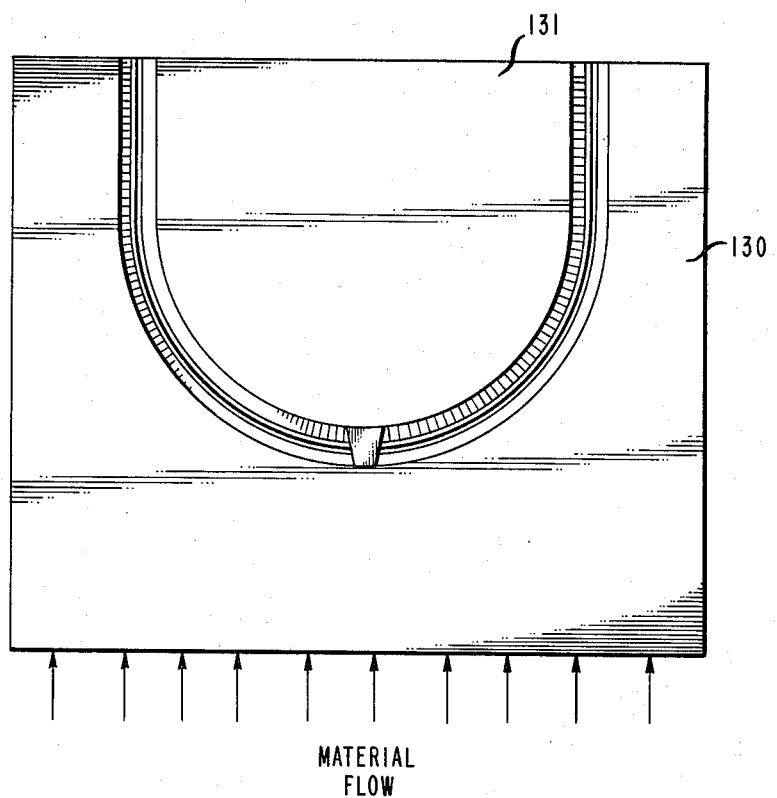
FIG. 13 shows a knockout that is partially surrounded by an outer region.

In addition to the circular shape shown above, the knockout can be made in a wide variety of shapes, including polygons, etc. Also, one knockout piece can be located inside another knockout piece. If desired, the two boundaries can then be of different thickness to allow, for example, the inner knockout to be more easily removed. In this manner, holes of various sizes can be obtained as desired. Rather than being entirely surrounded by an outer region as shown in FIG. 1, the knockout may communicate with an edge of the molded article as shown in FIG. 13. In that FIG., a U-shaped knockout 131 is shown being partially surrounded by region 130. Other shapes are also possible.

In the case of polycarbonate material as used above, the ease of removal of the knockout region is primarily due to the thinness of the boundary region, as compared to the other regions. This is because the strength of a weld line of a given thickness in polycarbonate material is almost as great as the strength of the same thickness of material without a weld line. However, in other materials, notably poly(vinyl chloride) among others, the weld line is inherently substantially weaker than the material itself. Thus, a weld line in such a material can be relatively thick and still achieve removable regions. Also, the so-called "filled materials", for example, nylon or polycarbonate having glass or other fibers included therein, typically obtain relatively weak weld lines. This is due in part to the fact that the fibers, typically included for increased strength, are inherently not continuous across the weld line. Various polymer or prepolymer materials, including those comprising non-polymer materials, are thus included herein.

Although injection molding has been discussed in the example above, the present technique includes the case of reaction injection molding, wherein typically two or more reactants are introduced into a cavity. The present technique can also be applied to other injection molding techniques known in the art. Various articles can advantageously be produced by the present technique. These include fluid reservoirs wherein it is desired to make a hermetic seal until a connection is made thereto. The controllable nature of the knockout allows a pressure relief point to be provided in an article, such as a sealed fluid container, etc. Also, an article comprising a polymer that is removed in the presence of a corrosive substance can be provided with a removable piece surrounded by a weld line region of first failure, for safety or other purposes. Chassis or panels for electronic or electrical equipment, where optional parts placement is desired, can also advantageously use the present technique. This technique also allows articles to assume a variety of shapes by breaking off pieces along the weld lines as desired. Thus, while the term "knockout" is illustratively used herein, the present technique includes the case of articles having removable pieces of any geometry for any purpose. Persons of skill in the art can utilize the present technique whereby a controlled weld line is produced for still other purposes, as will be apparent. All such deviations and variations which rely on the teaching through which the present invention has advanced the art are considered to be within the spirit and scope of the present invention.

What is claimed is:

1. A method of making an article by steps comprising introducing fluid polymer or prepolymer material into a cavity, allowing said material to at least partially solidify, and thereafter removing said material from said cavity, characterized in that
a portion of said material flows through one or more gates between a first region of said cavity and a second region of said cavity, whereby the boundary between the resulting first and second regions of the article exclusive of the one or more gates is a weld line formed by the flow front of said material, thereby producing an article having at least one removable piece.

2. The method of claim 1 wherein the thickness of said boundary is sufficiently small so that the second region can be removed from the first region of the article by applying a force to said second region that is sufficiently small so that substantially no damage occurs to said first region.

3. The method of claim 1 wherein said boundary and said one or more gates of said article form a hermetic seal between said first and second regions.

4. The method of claim 1 wherein said second regon is surrounded by said first region.

5. The method of claim 1 wherein said second region is partially surrounded by said first region.

6. The method of claim 4 or 5 wherein said fluid material is introduced into said first region of said cavity, thereafter flowing through said one or more gates into said second region of said cavity.

7. The method of claim 4 or 5 wherein said fluid material is introduced into said second region of said cavity, thereafter flowing through said one or more gates into said first region of said cavity.

8. The method of claim 4 or 5 wherein said fluid material is introduced into both said first and second regions of said cavity.

9. The method of claim 1 further comprising the step of removing one of said first and second regions of the article from the other region following said removing said material from said cavity.

* * * * *